United States Patent [19]
Fleming et al.

[11] 3,884,838
[45] May 20, 1975

[54] RUTHENIUM-REDUCED AMORPHOUS TUNGSTEN OXIDE CATALYST

[75] Inventors: Donald Kingsley Fleming, Park Ridge, Ill.; Sarabjit Singh Randhava, Hartsdale, N.Y.; Elias Humberto Camara, Hickory Hills, Ill.

[73] Assignee: Institute of Gas Technology, Chicago, Ill.

[22] Filed: Oct. 4, 1973

[21] Appl. No.: 403,538

Related U.S. Application Data

[63] Continuation-in-part of Ser. No. 68,632, Sept. 1, 1970, Pat. No. 3,787,468.

[52] U.S. Cl............. 252/470; 260/449 M; 252/467
[51] Int. Cl........................................... B01j 11/08
[58] Field of Search.................................. 252/470

[56] References Cited
UNITED STATES PATENTS

| | | | |
|---|---|---|---|
| 3,619,127 | 11/1971 | Hass et al. | 252/470 X |
| 3,661,769 | 5/1972 | Venuto et al. | 252/470 X |
| 3,661,805 | 5/1972 | Horvath | 252/470 X |
| 3,787,468 | 1/1974 | Fleming et al. | 252/470 X |
| 3,801,516 | 4/1974 | Juguin et al. | 252/470 X |

*Primary Examiner*—Paul F. Shaver
*Attorney, Agent, or Firm*—Molinare, Allegretti, Newitt & Witcoff

[57] ABSTRACT

A catalyst of Ru metal, and alloys of Ru with Pt, beneficated with reduced amorphous tungsten oxide. The catalyst is particularly useful in the conversion of CO, $CO_2$ or mixtures thereof to methane in the presence of hydrogen.

4 Claims, 7 Drawing Figures

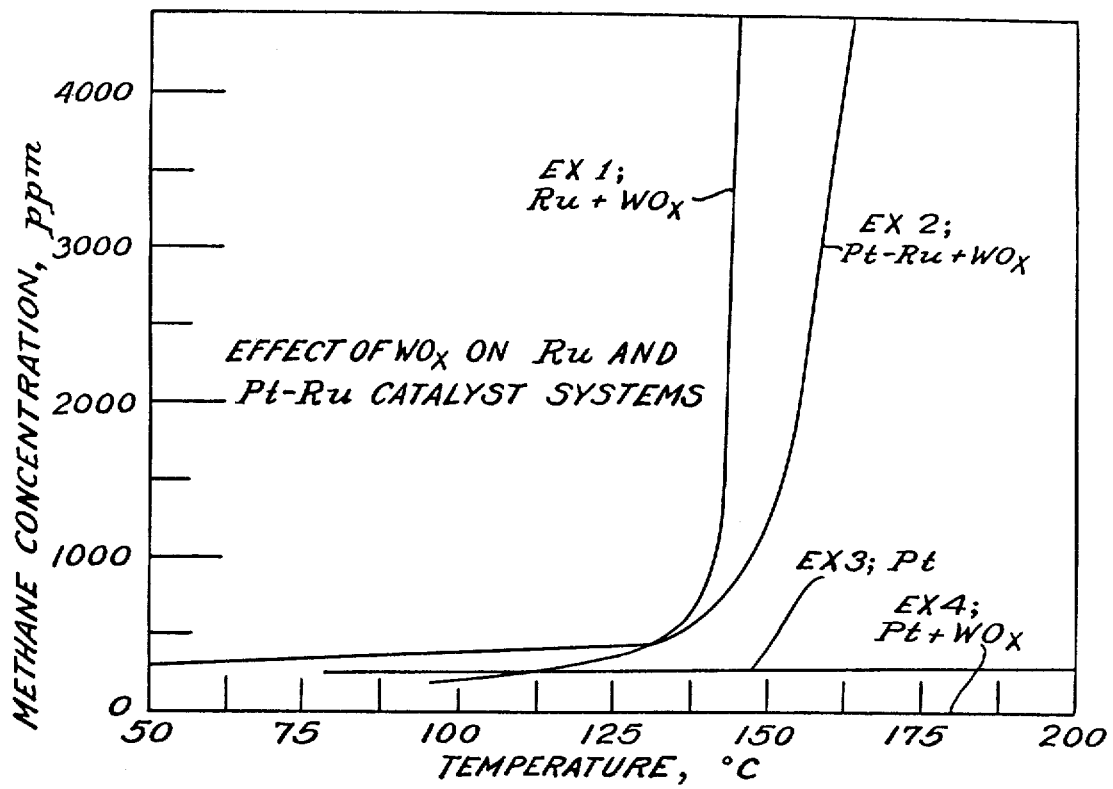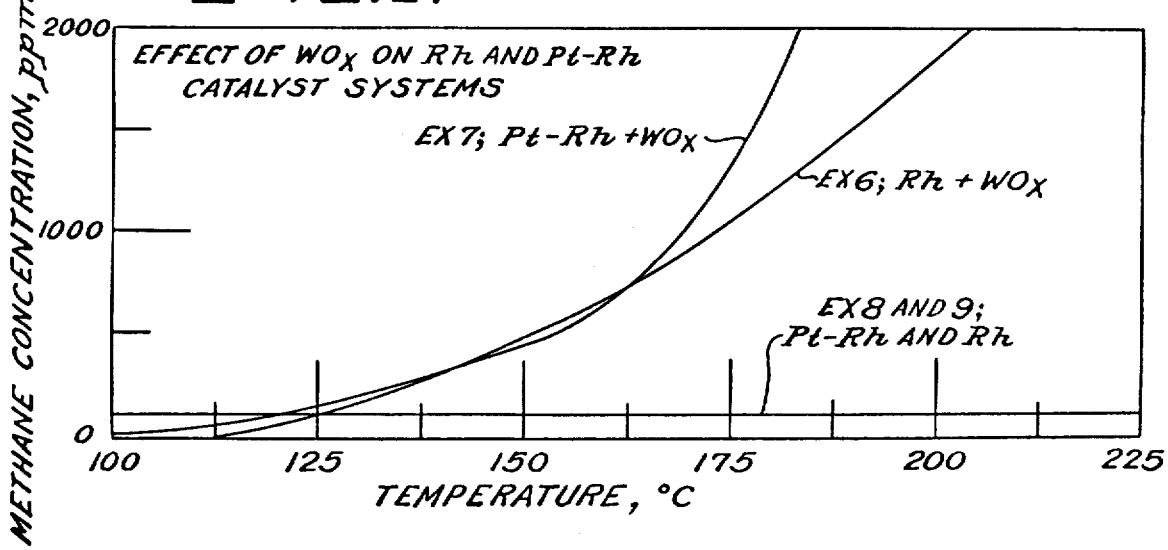

EFFECT OF $WO_x$ ADMIX ON CARBON MONOXIDE
IN EFFLUENT FROM Ru-SYSTEM CATALYSTS

RUTHENIUM-REDUCED AMORPHOUS TUNGSTEN OXIDE CATALYST

CROSS REFERENCE TO RELATED APPLICATIONS

This application is a continuation-in-part of our co-pending application Ser. No. 68,632, filed Sept. 1, 1970, and now U.S. Pat. No. 3,787,468.

FIELD OF THE INVENTION

This invention relates to improved catalysts for reacting carbon monoxide and/or carbon dioxide with hydrogen to form methane and water. More specifically, this invention relates to a multi-component catalyst containing ruthenium, with or without platinum, which catalyst is beneficated with a specific tungsten oxide.

BACKGROUND OF THE INVENTION

Heretofore, many kinds of metallic catalyst have been utilized in various supported and nonsupported forms to promote the reaction of carbon monoxide and carbon dioxide with hydrogen to form methane and water. These reactions are the basis of the standard Fischer-Tropsch reaction for the synthesis of hydrocarbons from carbon monoxide or carbon dioxide and hydrogen. In addition, these same reactions are employed in the clean-up reformer product gases before introduction into fuel cells, or before nitrogenation in ammonia synthesis plants. Most of the catalysts used in these reactions are primarily nickel-based and operate at relatively high temperatures, about 400°C. Further, they do not selectively methanate CO in the presence of $CO_2$. In addition, they require a relatively large reactor size, and the reaction conditions are relatively severe.

In a different field, multi-component fuel cell electrodes under conditions of electrical potential have been used to oxidize hydrogen with oxygen in the presence of a sulfonic acid electrolyte in the presence of carbon monoxide impurities. For example, the U.S. Pat. No. 3,357,863 discloses the use of rhodium catalyst containing tungsten oxide as such an electrode at 150°C in the presence of 10 percent carbon monoxide over a phosphoric acid electrolyte. The patent discloses up to 50 percent of the rhodium may be substituted by platinum or palladium. Similarly, in U.S. Pat. No. 3,364,072, 4-component electrode compositions of platinum and rhodium with tungsten and molybdenum oxide additives are disclosed as showing improved fuel cell performance in terms of current density at relatively lower percent carbon monoxide impurity, 0.1 – 1.0 percent, and somewhat lower temperatures, on the order of 70°C. Again, hydrogen was used as the fuel, oxygen was used as the oxidant, the electrolyte was sulfuric acid, and the electrode was tested under various voltages ranging from 0.7 to 0.85 volts.

It was also known from these two aforementioned patents, that platinum black operated somewhat better as an electrode under some of the low carbon monoxide conditions than platinum beneficated by either the molybdenum oxide or tungsten oxide. These results tend to indicate that, typical of the field, the operability of electrode compositions is relatibely unpredictable. In our own work evaluating such electrode compositions for operability in different gas feeds, specifically, a fuel containing 79.7 percent hydrogen, 20 percent carbon dioxide, and 0.3 percent carbon monoxide, it was determined that, at steady-state conditions of a test fuel cell at 150°C, there was no significant change in the carbon monoxide concentration in the fuel cell effluent as compared to the input feed. This work tends to indicate that there is no effective chemical reaction of CO in the operating fuel cell, the carbon monoxide concentration in the effluent agreeing with the value predicted by material balance, calculated on the basis of hydrogen consumed in the manufacture of the electricity in the fuel cell. It has also been noted in the literature that Pt-Ru combinations have been used in a fuel cell anode.

OBJECTS OF THE INVENTION

It is among the objects of this invention to provide a catalyst for converting carbon monoxide and/or carbon dioxide to methane at low reaction temperatures.

It is another object of this invention to provide a catalyst for cleaning-up reformer gas at low reaction temperatures which contains impurities of carbon monoxide and/or carbon dioxide to produce an improved product gas.

It is another object of this invention to provide a catalyst for producing a product gas at low reaction temperatures which may be utilized as an improved feed-gas for fuel cells, or for ammonia synthesis.

It is another object of this invention to provide a catalyst for methanation processes which have reduced operating temperatures, which mitigate the severity of the reaction, and minimize the reactor size.

It is another object of this invention to provide a catalyst capable of selectively methanating carbon monoxide in the presence of carbon dioxide and hydrogen by control of process conditions.

It is another object of this invention to provide a catalyst for methanating both the carbon monoxide and carbon dioxide simultaneously by control of process conditions.

It is another object of this invention to provide a catalyst for a methanation process which may be used alone, or in conjunction sequentially or simultaneously with electrochemical reactions which unlike the methanation process of this invention, may be under an electrical potential.

Still further objects of this invention will be evident from the detailed description which follows.

THE INVENTION

Summary

We have discovered catalysts that can methanate carbon monoxide and/or carbon dioxide by reaction with hydrogen. These catalysts include ruthenium metals having minor amounts of reduced amorphous tungsten oxide admixed therewith. The ruthenium may be used alone or in mixtures and with platinum. We have discovered, unexpectedly, that the minor amounts of reduced amorphous tungsten oxide admixed with the ruthenium have a synergistic effect in a methanation process. In addition, the methanation activity is quite unexpected in view of the fact that tests show that there is no net effective carbon monoxide chemical reaction in an operating fuel cell using such materials under electrical potential as electrodes. These catalysts could also find utility as fuel cell electrodes and hydrocarbon conversion catalysts.

In contrast to the utility of platinum black as an effective electrode at low carbon monoxide concentrations as set forth in prior art, we have discovered that platinum is relatively inert in a methanation process. We have discovered that the activity of our catalyst, ruthenium plus reduced amorphous tungsten oxide and mixed catalysts of ruthenium platinum and reduced amorphous tungsten oxide are superior to catalysts of rhodium plus reduced amorphous tungsten oxide with or without platinum. Control of the product gas composition resulting from methanation processes utilizing the catalyst of the present invention can be obtained by predetermined and preselected control of the process parameters, particularly the input gas flow rates and the temperature conditions of the methanation reactor.

THE FIGURES

In the following detailed description, reference will be had to the drawings, in which:

FIG. 2 is a graphical representation of the same catalyst as shown in FIG. 1 and illustrates the corresponding increase in methane concentration as a result of the increase in methanation with increasing temperature;

FIG. 4 shows the same catalyst as used in FIG. 3, and graphically illustrates the increase in methane concentration;

Figure 5:
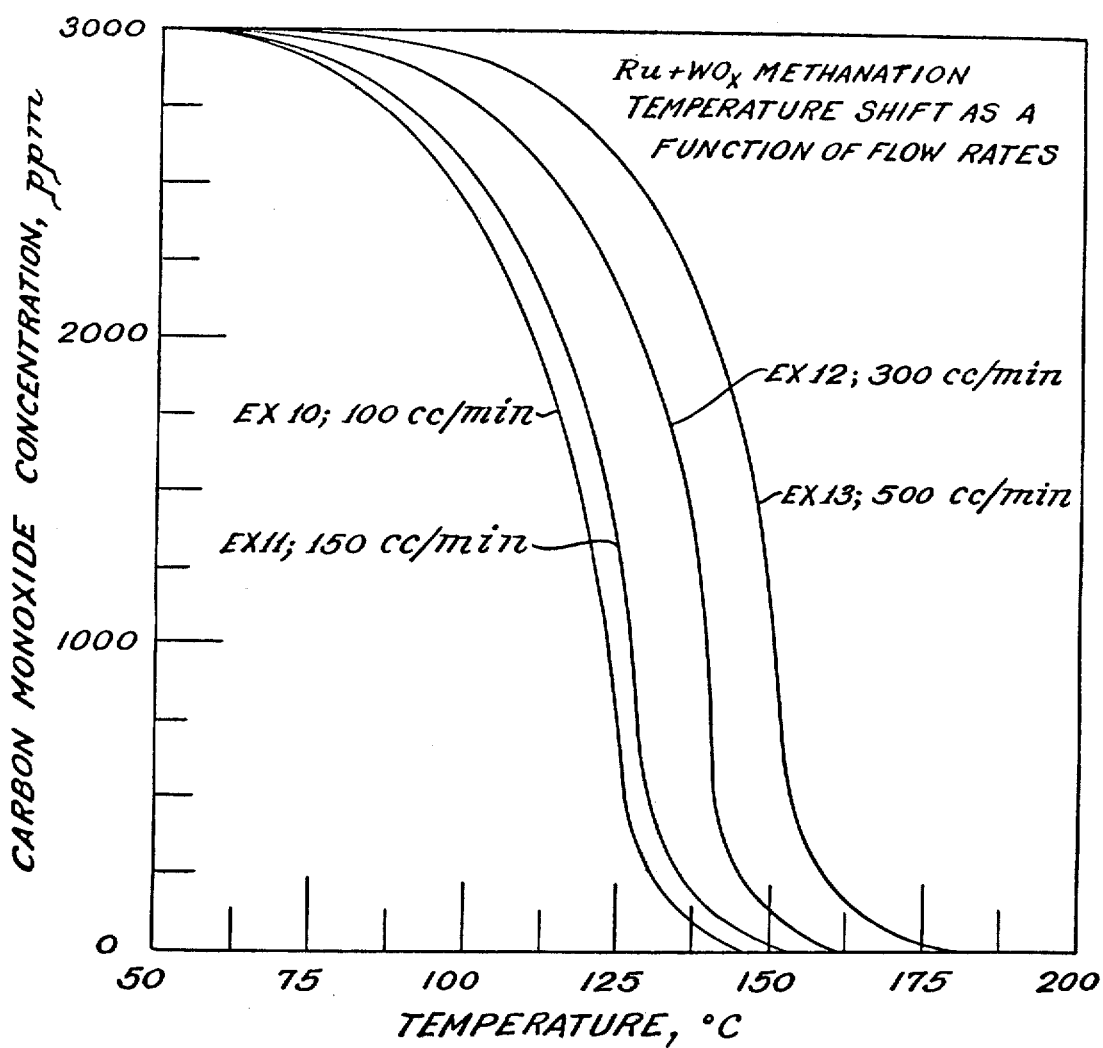
Figure 6:
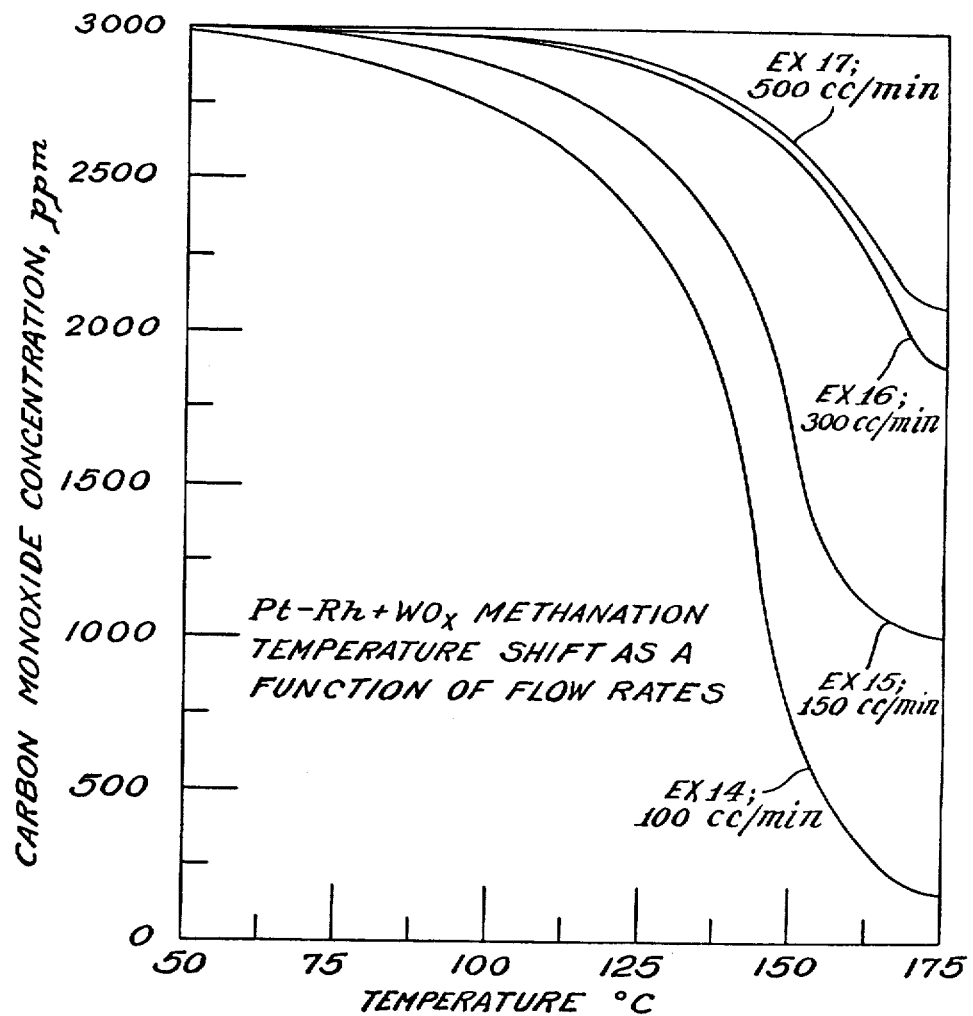
Figure 7:
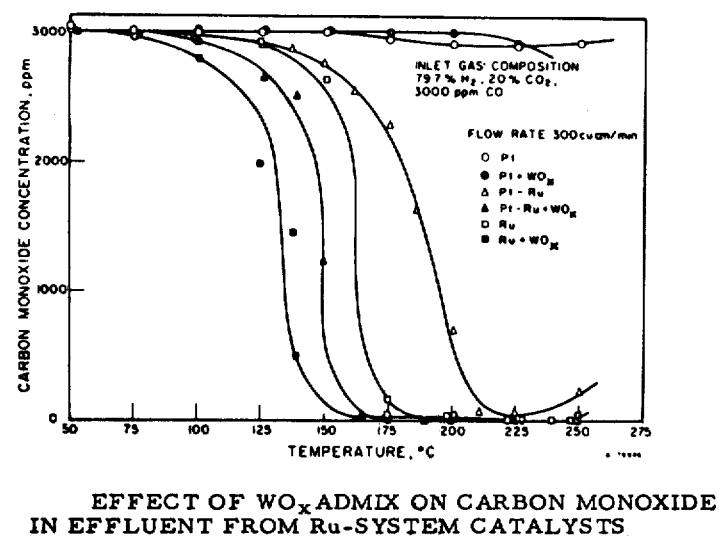

FIG. 5 graphically illustrates the temperature and flow rate relationship in control of the methanation reaction using the reduced amorphous tungsten oxide beneficated ruthenium catalyst of the present invention;

FIG. 6 is similar to FIG. 5 and graphically illustrates the flow rate and temperature relationship for a tungsten oxide beneficated rhodium catalyst; and FIG. 7 graphically illustrates the change in carbon monoxide concentration as a function of temperature for various platinum, ruthenium or reduced amorphous tungsten oxide containing catalysts.

DETAILED DESCRIPTION

We have discovered that certain metallic materials, when employed in a methanation reactor as a catalyst, have the unexpected property of methanating carbon monoxide and carbon dioxide containing feed gases at temperatures below about 250°C and above about 75°C, and preferably in the range of about 100°–175°C. We have also discovered that there is selective methanation of carbon monoxide in gases which contain both carbon monoxide and carbon dioxide. This selectivity is particularly apparent at temperatures below about 150°C. By control of the temperature and flow rate of the input gas in our process, we are able to selectively methanate carbon monoxide in the presence of the carbon dioxide without substantially methanating carbon dioxide.

In other words, although both carbon dioxide and carbon monoxide are both methanated at a given set of reactions conditions, we have found that at low temperatures, the rate of carbon monoxide conversion substantially exceeds the rate of carbon dioxide conversion. While not to be bound by theory we believe this is because CO is thermodynamically less stable than $CO_2$ and hence is more readily converted. In addition, gases containing only carbon dioxide and hydrogen can also be methanated by the catalyst of this invention. There is a substantial portion of hydrogen in the inlet gas composition, as for example, in a product gas from a reforming process just upstream from the methanation process.

For temperatures in the range of 100°–250°C, we prefer to employ a flow rate on the order of 100–500 cc./min., or up to 1 liter/min. where the feed gas is initially CO-free. However, it should be understood that as the flow rate of the gas through our reactor is reduced, the temperature of methanation may be reduced below 100°C. and the methanation controlled thereby. Thus, by control of the flow rate and temperature, we can control the output composition of the product gas from our process in a manner known to the art since thermodynamics requires increased CO and $CO_2$ conversion during methanation as temperature increases. One preferred mode of operation of the process of this invention is the production of a gas which contains substantially no carbon monoxide, and which is useful, inter alia, in ammonia synthesis plants, and for use as fuel for various types of fuel cells, both low and high temperature fuel cells.

Surprisingly, we have found that platinum electrode materials, attempted to be employed in a methanation process as a catalyst material show substantially no activity for methanation in the low temperature range employed in our process. Similarly, the use of platinum beneficated by small percentages of reduced amorphous tungsten oxide also shows substantially no promotion of methanation.

The tungsten oxide used in conjunction with the ruthenium is an amorphous form not characterized as $WO_3$ or $W_2O_5$, and is hereinafter termed $WO_x$ for brevity. The catalyst mixtures are prepared in accord with the detailed description below.

We have discovered that an effective catalyst for use in a methanation process is a ruthenium catalyst beneficated with a synergistic amount of tungsten oxide, hereinafter referred to as $Ru + WO_x$ for brevity. This catalyst can also contain platinum as a platinumruthenium alloy beneficated by a synergistic amount of tungsten oxide, hereinafter $Pt - Ru + WO_x$. Both $Pt - Ru + WO_x$ and $Ru + WO_x$ catalysts are termed ruthenium-containing catalysts in the present specification.

Figure 1:
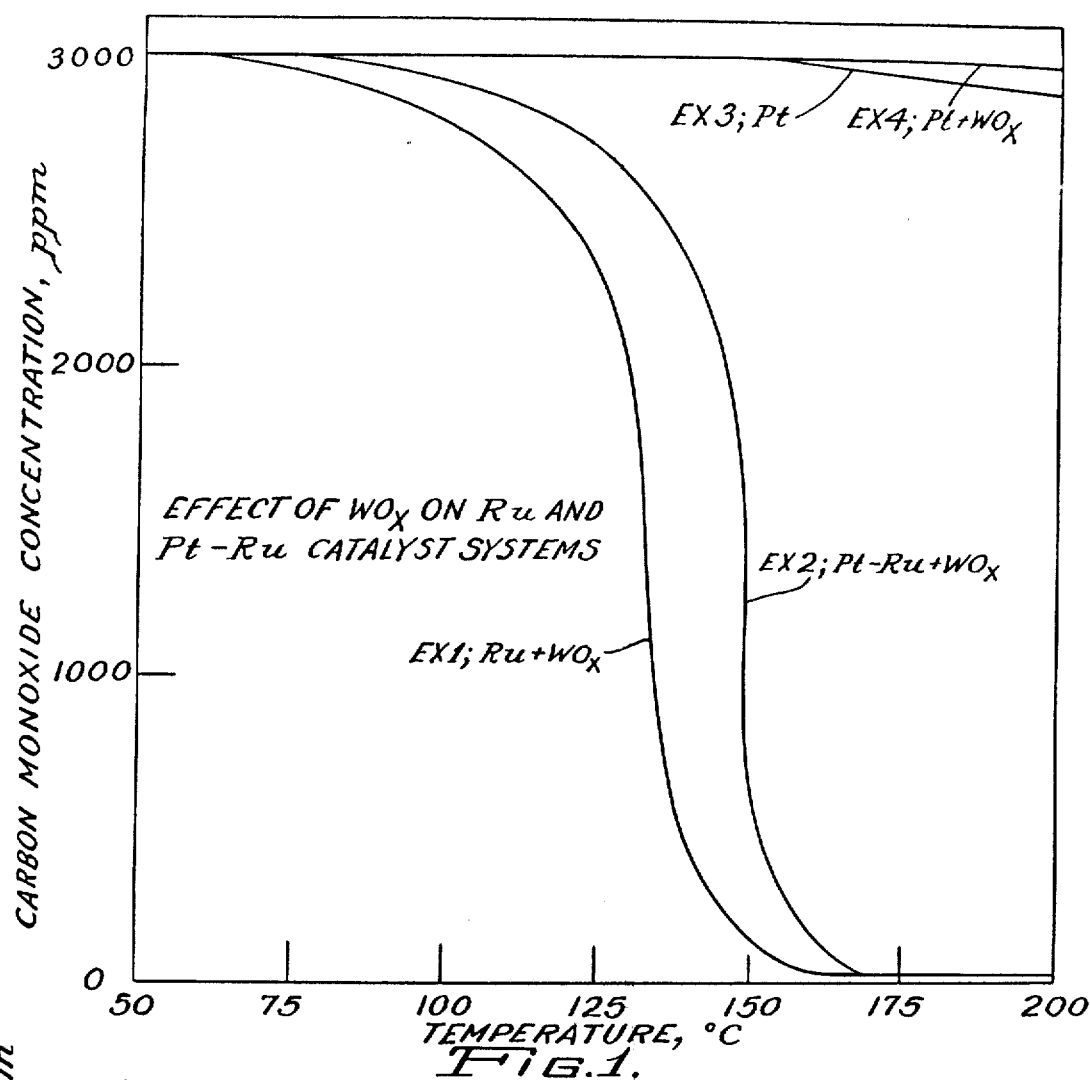
FIG. 1 is a graphical representation of the change in carbon monoxide concentration with temperature in a methanation reaction catalyzed by the synergisitic catalyst of the present invention, a reduced amorphous tungsten oxide ruthenium catalyst, with or without platinum, in comparison to a platinum and a platinum reduced amorphous tungsten oxide catalyst.

A $Pt - Ru + WO_x$ catalyst with high Pt concentration falls about 20°C behind the $Ru + WO_x$ catalyst in terms of methanation rate effectiveness: that is, the same methanation occurs about 20°C higher for $Pt - Ru + WO_x$ than $Ru + WO_x$. Preferably no more than about 50 percent, by weight, of the ruthenium may be substituted by platinum. The effect of platinum is illustrated in FIG. 1, which shows the activity of tungsten in ruthenium-containing catalysts. As can be seen by comparing FIGS. 1 and 2, substantially all of the carbon monoxide concentration in the inlet gas composition has been reacted at a temperature below about 165°C. The initial inlet gas composition is 0.3 percent carbon monoxide, i.e., 3000 ppm.

The corresponding graph showing the increase in methane composition in the output gas for the Ru-containing catalysts is shown in FIG. 2. At a temperature of about 165°C, the methane concentration is substantially above 3,000 ppm. Indeed, for the Ru + $WO_x$ catalyst, the concentration exceeds 3,000 ppm. at a temperature of about 145°C, while the corresponding value for a high platinum level Pt − Ru + $WO_x$ catalyst is about 160°C. Since the methane concentration continues to increase as the temperature increases, the two figures, FIGS. 1 and 2, taken together, show that the carbon monoxide is selectively methanated at lower temperatures. As temperatures are increased, this selectivity becomes less apparent. Further, it was discovered that the presence of carbon monoxide lowers the reaction rates, beyond that to be expected by dilution of carbon dioxide effects. Of course, in gases not containing carbon monoxide, the methanation of the carbon dioxide can proceed unhindered by the presence of carbon monoxide.

Figure 3:
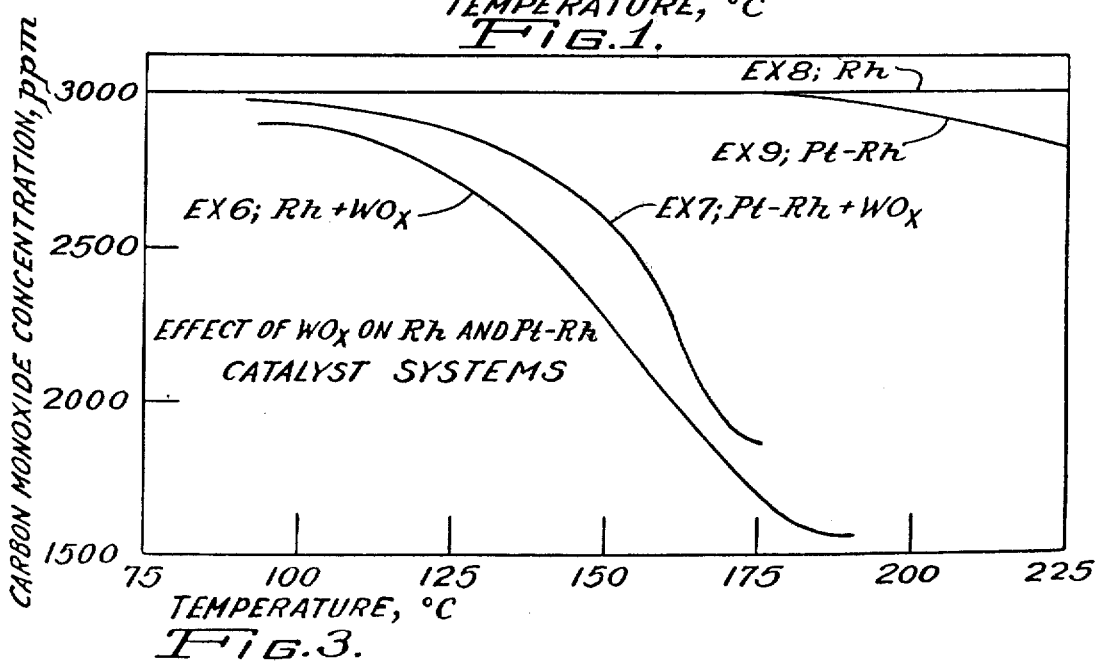
FIG. 3 shows the lesser catalyst effects of tungsten oxide on a rhodium, and a rhodium-platinum catalyst in a methanation reaction.

FIG. 3 illustrates a second catalyst system of tungsten oxide on a rhodium catalyst and on a platinum-rhodium alloy, hereinafter Rh + $WO_x$ and Pt − Rh + $WO_x$ catalysts. Surprisingly, we have found that ruthenium-$WO_x$ catalysts are markedly superior to rhodium-$WO_x$ catalysts despite their close proximity in Group VIII of the Periodic Table. In addition, FIG. 3 in conjunction with FIG. 1 illustrates that platinum, platinum beneficated by tungsten oxide, platinum-rhodium alloys, and rhodium alone, do not substantially methanate the carbon monoxide at the temperatures indicated. Thus, the Rh + $WO_x$ and Pt − Rh + $WO_x$ are highly specific as compared to Pt or Rh alone, Pt − $WO_x$ and Pt − Rh without $WO_x$, but are inferior to the corresponding ruthenium catalysts. The corresponding values for the methane concentration are shown in FIG. 2.

The temperature-flow rate relationship relative to CO selectivity discussed above is shown in FIG. 5 for the Ru + $WO_x$ catalyst, while FIG. 6 shows the temperature-flow rate relationship for the Pt − Rh + $WO_x$ catalyst.

As noted above, platinum and platinum beneficated by tungsten oxide lack effectiveness in the process of this invention as methanation catalysts. Equally surprising, we have discovered that amorphous molybdenum oxide, hereinafter $MoO_x$, has no appreciable effect on methanation capabilities of both ruthenium and rhodium. This reinforces the selective and sequential methanation specificity of the catalysts of this invention.

Table 1 lists the combinations, according to systems and admixtures.

The following description of specific examples is illustrative of our invention, with curves in FIGS. 1–6 being related to the separate examples as indicated thereon.

The metal mixtures suitable for use as the catalysts in our process can be prepared by a straightforward procedure known to the art which involves the steps of initially admixing, in an aqueous environment, an alkali metal borohydride, such as sodium borohydride or potassium borohydride, and a mixture comprising: (a) a ruthenium salt, i.e., ruthenium halide, such as ruthenium chloride, or ruthenium bromide and (b) ammonium or an alkali metal metatungstate. A preferred method for forming the Ru − $WO_x$ catalysts of the present invention is illustrated in U.S. Pat. No. 3,407,032 and British Pat. No. 1,144,824 (U.S. Pat. No. 3,357,863), the teachings of which are incorporated by reference herein. There results a co-precipitated catalyst mixture containing essentially active ruthenium metal as well as a reduced, amorphous oxide of tungsten. The resultant mixture is combined with (a) an aqueous dispersion of binder-Waterproofing agent, such as polytetrafluoroethylene, polychlortrifluoroethylene or polyethylene and (b) mineral oil to form a catalyst mixture paste of the same. When the waterproofing agent is present the catalysts are used in a fuel cell construction or environment. A waterproofing agent is not otherwise essential to the present invention.

In general, a wide range of catalyst components can be used in our process. For instance, there is contemplated utilizing from about 80 percent to about 95 percent ruthenium and from about 5 percent to about 20 percent reduced amorphous oxide of tungsten on a weight basis. Good catalytic performance is obtained with a mixture comprising 85 percent ruthenium and 15 percent reduced tungsten oxide.

Advantageously, a portion of the ruthenium component may be substituted according to the invention. Thus, not more than up to about 50 percent of the ruthenium metal content may be substituted by platinum. Thus, in the preparation of the catalyst from 0 percent to 30 percent chloroplatinic acid, 30 percent to 60 percent ruthenium halide and 40 percent ammonium metatungstate can be admixed to recover a catalyst having the following composition:

|     |                       | Percent    |
|-----|-----------------------|------------|
| (a) | Rhodium or ruthenium  | 40 – 95    |
| (b) | Platinum              | 0 – 47.5   |
| (c) | Reduced tungsten oxide| 5 – 20     |

The catalyst mixture paste was spread on a supporting grid or screen of stainless steel, tantalum or acrylic fiber paper and let dry to form a catalyst sheet so that the catalyst could be evaluated in a fuel cell construction for ease in testing. The amount of the mixed metal catalyst is preselected to provide from 5 to 40 mg. catalyst/cm² of the catalyst sheet. For testing purposes to best show the effectiveness at low catalyst loadings, 5 mg/cm² was used. For the noble metals test involving Table 1.

CATEGORIZATION OF CATALYSTS

|                  | Metals | Mixed Metals | Admixtures $WO_x$ | $MoO_x$ |
|------------------|--------|--------------|-------------------|--------------|
| Rhodium System   | Pt     |              | Pt + $WO_x$       |              |
|                  |        | Pt − Rh      | Pt − Rh + $WO_x$  | Pt − Rh + $MoO_x$ |
|                  | Rh     |              | Rh + $WO_x$       |              |
| Ruthenium System | Pt     |              | Pt + $WO_x$       |              |
|                  |        | Pt − Ru      | Pt − Ru + $WO_x$  | Pt − Ru + $MoO_x$ |
|                  | Ru     |              | Ru + $WO_x$       |              |

*It is to be understood that the $MoO_x$ is listed here for completeness only since it does not show appreciable effect on methanation capabilities of Ru and Rh.

Pt — Rh and Pt — Ru, the weight proportions of the Pt and the Ru or Rh were the same.

The reactors were a standard test fuel cell having tantalum and stainless steel end plates, which were tested and found inert for the reactions. The dry catalyst sheet was placed against a 0.100 inch solid Teflon gasket and surrounded by a 0.100 inch Teflon frame gasket so that the area of the catalyst sheet was determined by the opening size of the frame gasket, in all tests 2 × 2 inches. The gasket-catalyst sheet was then secured between the end plates by bolts, and the catalyst sheet fixed in place against the solid Teflon gasket, inter alia, to prevent sagging, by means of standard expanded-metal tantalum screens in the frame gasket opening. With inlets and outlets in one end plate, the reaction presents a thin, wide chamber with one catalyzed wall. The catalyst sheet was not placed under any electrical potential and the entire test cell was heated to, and maintained at, the preselected temperature within the test range of 50° – 275°C.

In operation, either the standard test fuel gas or a reference gas (for calibrating the analyzing instrument) is admitted to the system through a pressure regulator and block valve. The gas passes through a flow-indicating rotometer and a flow regulator which control a constant, downstream flow rate, regardless of the upstream pressure. The gas then flows either to the test cell or to a bypass. Leaving the test cell, the gas goes either to a bubble flowmeter or to the gas analysis train. The bubble flowmeter is used to adjust the flow controller for each run. The gas analyzing equipment is calibrated with a reference and the standard test gas at the beginning of each run. In a given test, when the cell temperature stabilized, as controlled by a proportional temperature-indicating controller and verified by a strip-chart temperature recorder, the bypass valve is closed and the gas fed to the test cell for several minutes to establish steady-state conditions. The carbon monoxide and methane contents in the effluent gas were then recorded as a function of temperature.

The gas compositions were determined by sensitive infrared analyzers calibrated for the detection of carbon monoxide and methane. The first unit in the analysis train is a Lira Model 200, manufactured by Mine Safety Appliances, Pittsburgh, Pa. It has three carbon monoxide ranges with full-scale sensitivities of 100, 500, and 500 ppm. CO. Although the lower range is direct reading, non-linearity exists in the upper two ranges so that calibration curves are required. When used with these curves, the Lira IR analyzer continuously monitors the carbon monoxide concentration in the flowing gas stream with an estimated accuracy of 2 percent of full scale. The analyzer used for methane determination is a Lira Model 300, which has greater electronic drift so the absolute values of the methane concentrations are somewhat greater than 2 percent of full scale. This unit has a single range of 0 – 6,000 ppm. methane.

The gas flow rate used in most of this work was 300 cu/cm/min. except where rate of flow tests were run. This standard flow rate indicates the relative performances of the catalysts. The average residence time in the cell is approximately ¾ second and the gas flow is laminar.

The primary feed gas was a simulated reformer product of 79.7 percent $H_2$, 20 percent $CO_2$, and 0.3 percent CO. Gas of this composition may be expected after reforming and shifting reactions with a high $H_2O/CH_4$ ratio in the feed to a reformer. In some tests, a reference gas containing 80 percent hydrogen and 20 percent carbon dioxide was used. This gas determines the effect of a carbon monoxide-free feed. Unless otherwise indicated, the tests were run with dry feed. The test runs were made over the temperature range of from 50°C to between 175° to 250°C, and the results were plotted as a series of best curves on the accompanying FIGS. 1 – 6. Where the catalyst metal used an oxide additive, it was present as 15 percent by weight.

In general, the relative capabilities of these catalysts in promoting the reactions were determined by the change in the CO and $CH_4$ concentrations in the effluent gas stream. Any increase in the $CH_4$ concentration is indicative of methanation of CO or $CO_2$. If an increase in $CH_4$ concentration is accompanied by a corresponding decrease in the CO level, then the methanation of CO is taking place.

A decrease in the CO concentration could mean either CO was methanating, or CO plus water was shifted to $CO_2$. A corresponding increase in the $CH_4$ level indicates that it is methanation of CO which is taking place. An increase in CO content, without a change in the $CH_4$ level, indicates that the $CO_2$ was shifted to CO plus water.

EXAMPLES 1 – 4

FIGS. 1 and 2 show the results from runs at temperatures from 50° to 175°C using 20 percent $CO_2$, 0.3 percent CO, 79.7 percent $H_2$ at 300 cc/min. as follows:

| | |
|---|---|
| Example 1 | Ru + $WO_x$ 85:15% by weight at 5 mg/cm² loading; |
| Example 2 | Pt — Ru + $WO_x$ 42.5:42.5:15% by weight; same loading as Example 1; |
| Example 3 | Pt alone, same loading as Example 1; |
| Example 4 | Pt + $WO_x$ 85:15% by weight; same loading as Example 1. |

FIG. 1 shown the best curve for the data on the drop in CO concentration in the effluent and compares the Pt and $WO_x$ beneficated Pt, with Ru + $WO_x$, and Pt — Ru alloy beneficated with $WO_x$. The Ru + $WO_x$ is active while the Pt and Pt + $WO_x$ are substantially inert as methanation catalysts in our process. FIG. 2 shows the corresponding methane concentration increase. The fact that the methane values exceed 3000 ppm. in FIG. 2 at temperatures above 140°C for Ru + $WO_x$ and 160° for Pt — Ru + $WO_x$, while the CO concentration (FIG. 1) is "zero" at those temperatures, shows that the CO is substantially completely methanated and the $CO_2$ is being effectively methanated at these higher temperatures. The activity of $WO_x$ in Ru or Pt — Ru alloys for the methanation is clear.

EXAMPLE 5

The catalyst of Example 2 was re-run using a feed of 80 percent $H_2$, and 20 percent $CO_2$ at the same flow rate, 300 cc/min to test the direct methanation of $CO_2$ in the absence of CO. The results are as follows:

| ppm Methane | Temperature |
|---|---|
| 350 | 100 |
| 1200 | 125 |
| 2375 | 140 |
| 4100 | 145 |

By comparing these values with those interpolated from Example 2 of FIG. 2, it can be seen that the methanation of $CO_2$ in the presence of CO lags, in terms of temperature, behind CO free $CO_2$ by 25° – 30°C initially and this decreases to about 10°C at values above 3000 ppm. This indicates that the $CO_2$ will methanate in the presence or absence of $CO_2$, but that CO suppresses, to some degree, the rate of conversion of $CO_2$.

EXAMPLES 6 – 9

FIGS. 3 and 4 show the results from runs at temperatures from 75° to 225°C using the same feed and flow rate as in Examples 1 – 4, as follows:

| Example 6 | Rh + $WO_x$, 85:15% by weight, same loading as Examples 1 – 4; |
| Example 7 | Pt – Rh + $WO_x$, 42.5:42.5:15% by weight, same loading as Examples 1 – 4; |
| Example 8 | Rh alone, same loading as Examples 1 – 4; |
| Example 9 | Pt – Rh, 50:50% by weight, same loading as Examples 1 – 4. |

FIGS. 3 and 4 correspond to FIGS. 1 and 2 except they show the data for the rhodium family of catalyst materials. As seen from FIGS. 1 and 2, Pt and Pt + $WO_x$ are substantially inert. Likewise, Rh alone (Example 8) is inert, while Pt – Rh alloy (Example 9) is only slightly more active than the relatively inert Pt + $WO_x$, at temperatures from 175° – 225°C. In contrast, under the conditions tested, both Rh and Pt – Rh alloy have increased methanation activity when beneficated with $WO_x$, but the increased methanation activity is substantially less than that obtained with the ruthenium catalysts of the present invention. The CO concentrations for catalysts of Examples 6 and 7 increase again at higher temperatures due to their effectiveness as CO shift catalysts; this effect is not illustrated herein since it is the subject of our U.S. Pat. No. 3,718,418.

EXAMPLES 10 – 17

FIGS. 5 and 6 show the control of the output gas composition for Ru + $WO_x$ catalyst of Example 1, and the Pt – Rh + $WO_x$ catalyst of Examaple 7, utilizing the feed gas of Examples 1 – 4 and 6 – 9 as follows:

| Examples | Catalyst | Flow-Rate |
|---|---|---|
| 10 | Ru + $WO_x$ 85:15 | 100 cc/min |
| 11 | Ru + $WO_x$ 85:15 | 150 cc/min |
| 12 | Ru + $WO_x$ 85:15 | 300 cc/min |
| 13 | Ru + $WO_x$ 85:15 | 500 cc/min |
| 14 | Pt – Rh + $WO_x$ 43.5:42.5:15 | 100 cc/min |
| 15 | Pt – Rh + $WO_x$ 42.5:42.5:15 | 150 cc/min |
| 16 | Pt – Rh + $WO_x$ 42.5:42.5:15 | 300 cc/min |
| 17 | Pt – Rh + $WO_x$ 42.5:42.5:15 | 500 cc/min |

As can be seen from the results in FIGS. 5 and 6, the CO content of the output gas decreases (and correspondingly, but not shown) the methane content increases. The amount of CO conversion can be determined by preselected control of the temperature and flow rate. Where high flow rate is used, the CO content can be simply controlled by selecting temperature between about 75° through 190°C. (FIG. 5). Conversely, where a given temperature is preselected to be held constant, say 140°C., the flow rate can be cut down from 500 to 100, to cut the exit gas ppm. of CO from about 2000 to substantially zero. FIG. 6 shows the comparable values for the Pt – Rh + $WO_x$ catalyst system process control, and in addition, shows that the total methanation capability of the catalyst improves with decrease in flow rate, indicating that residence time in the reactor is a control parameter. For a 300 cc/min flow rate in the test cell, the reactor residence time is about ¾ second, and this residence time may be varied from about 1/100 second to 5 seconds. In the case of CO-free feed, the $CO_2$ will methanate in a pattern of flow rate-temperature curves similar to the curves of FIGS. 5 and 6.

FIG. 7 tabulates experiments with catalyst loadings of 5 mg/cm² for pure Pt and pure Ru and various combinations of Pt and/or Ru with $WO_x$ as set forth in the previous examples. This figure illustrates that Pt – Ru + $WO_x$ and Ru – $WO_x$ are more active in a methanation reaction than Ru, Pt and Ru–Pt catalysts and clearly establishes the unusual, unexpected synergism obtained.

In addition to the catalyst sheets used in the specific examples above, the catalysts of this invention may be used in other forms, for example, deposited on alumina, silica, silica-alumina, crystalline aluminosilicates such as faujasite or mordenite, etc., supports in granular, spherical, cylindrical honeycomb or "saddle" forms. Likewise, other modifications may be made in the process of our invention without departing from the spirit thereof.

We claim:

1. A catalyst composition consisting essentially of ruthenium, having from 0 – 50 percent of said ruthenium alloyed with platinum, and reduced amorphous oxide of tungsten.

2. A metallic catalyst composition as in claim 1 wherein said reduced amorphous tungsten oxide is present in an amount of from 5 – 20 percent by weight.

3. A metallic catalyst composition as in claim 2 wherein said reduced amorphous tungsten oxide is present in an amount of about 15 percent by weight.

4. A metallic catalyst composition as in claim 1 deposited on a support material.

* * * * *